United States Patent Office 2,720,525
Patented Oct. 11, 1955

2,720,525

QUINOLINE SALTS OF AMIC ACIDS

Leonard M. Rice, Baltimore, and Charles F. Geschickter, Kensington, Md., assignors to The Geschickter Fund for Medical Research, Inc., Washington, D. C., a corporation of New York No Drawing. Application July 30, 1954,
Serial No. 446,946

6 Claims. (Cl. 260—286)

The present invention relates to quinoline compounds and particularly to novel amate salts of 6-methoxy-4-(dimethylaminoethylamino)quinoline.

This application is a continuation-in-part of application Serial No. 378,422, filed September 3, 1953.

Application for United States Letters Patent, Serial No. 251,980, filed October 18, 1951, now abandoned, and Serial No. 378,420, filed September 3, 1953, as a continuation-in-part of Serial No. 251,980, now abandoned, describe and claim certain quinoline derivatives for use in the treatment of asthma, hayfever and similar allergic diseases. The compounds described in those applications are effective but it has been found that certain quinoline salts hereinafter described are more effective due to the fact that they are readily absorbed in the body and have a longer and a more cumulative effect.

One of the objects of the present invention is therefore to provide novel quinoline salts which are readily absorbed in the body.

Another object is to provide quinoline salts which have a long and cumulative therapeutic effect.

The salts found to be particularly advantageous for the therapeutic purposes outlined above are the theophylline, quininic acid and certain amate salts of 6-methoxy-4-(dimethylaminoethylamino)quinoline. The theophylline and quininic acid salts and their method of preparation are fully described in the aforementioned application Serial No. 378,422. The present application relates particularly to the amate salts. The particular amates embraced by the present invention are those of N,N-di-lower alkyl substituted phthalamic, hexahydrophthalamic, and cis-$\Delta^4$ tetrahydrophthalamic acids, lower alkyl being herein specifically defined as methyl and ethyl.

Following is a specific example of one of the novel compounds embraced by the invention and of its method of preparation:

The N,N-diethyl-cis-$\Delta^4$-tetrahydrophthalamate salt of 6-methoxy-4 (dimethylaminoethylamino) quinoline A mixture of 45.5 grams (0.2 mol) of N,N-diethyl-cis-$\Delta^4$-tetrahydrophthalamic acid and 25.5 grams (0.1 mol.) of 6-methoxy-4-(dimethylaminoethylamino) quinoline are dissolved in 200 ml. (a convenient quantity) of dry acetone. The solution, after filtering is transferred to a container of suitable size and the acetone removed under reduced pressure. After most of the acetone has been removed the last traces are removed under high vacuum (less than 0.1 mm.). The residue is loosely powdered, transferred to a mortar and finely powdered. The product is an almost white, free flowing hygroscopic powder.

In the process illustrated in the foregoing example, the following amic acids may be used in place of N,N-diethyl-cis-$\Delta^4$-tetrahydrophthalamic acid to obtain the corresponding salts:

N,N-dimethyl phthalamic
N,N-diethyl phthalamic
N,N-dimethyl hexahydrophthalamic
N,N-diethyl hexahydrophthalamic
N,N-dimethyl-cis-$\Delta^4$ tetrahydrophthalamic The process is the same as described in the above example for all the amic acids listed.

Methods for preparing the substituted amic acids of the type listed above are fully disclosed in copending application Serial No. 378,417, filed September 3, 1953.

The novel salts described hereinabove have low toxicity; in tests on rats and mice, the LD 50 is approximately 300 mg. per kilogram.

The salts may be administered orally or by injection. For oral administration, 50 mg. capsules may be given once or twice daily. For intra-muscular injection, the salts may be dissolved in water or a benzyl alcohol and dioctyl solution, usually about 100 to 120 mg. per cc. About one-half cc. may be injected daily for one week and then every other day or weekly as indicated. Regardless of the method of administration, the salts are not excreted from the body as fast as they are absorbed so that the effects are long and cumulative.

From the foregoing it will be apparent that the objects of the invention are attained and new and improved quinoline salts have been provided. Various modifications may of course be made without departing from the spirit of the invention or the scope of the appended claims.

What is claimed and desired to be secured by United States Letters Patent is:

1. As novel compositions of matter, the 4-dimethylaminoethylamino-6-methoxyquinoline salts of amic acids selected from the group consisting of: N,N-dimethyl phthalamic acid; N,N-diethyl phthalamic acid; N,N-dimethyl-cis-$\Delta^4$-tetrahydrophthalamic acid; N,N-diethyl-cis-$\Delta^4$-tetrahydrophthalamic acid; N,N-dimethyl hexahydrophthalamic acid; and N,N-diethyl hexahydrophthalamic acid.

2. As a novel composition of matter, the 4-dimethylaminoethylamino-6-methoxyquinoline salt of N,N-dimethyl-cis-$\Delta^4$-tetrahydrophthalamic acid.

3. As a novel composition of matter the 4-dimethylaminoethylamino-6-methoxyquinoline salt of N,N-diethyl-cis-$\Delta^4$-tetrahydrophthalamic acid.

4. As a novel composition of matter the 4-dimethylaminoethylamino-6-methoxyquinoline salt of N,N-diethylhexahydrophthalamic acid.

5. As a novel composition of matter, the 4-dimethylaminoethylamino-6-methoxyquinoline salt of N,N-dimethyl hexahydrophthalamic acid.

6. As a novel composition of matter, the 4-dimethylaminoethylamino-6-methoxy quinoline salt of N,N-diethyl phthalamic acid.

No references cited.